(12) United States Patent
Huang et al.

(10) Patent No.: US 8,659,618 B2
(45) Date of Patent: Feb. 25, 2014

(54) NOISE-ROBUST EDGE ENHANCEMENT SYSTEM AND METHOD FOR IMPROVED IMAGE SHARPNESS

(75) Inventors: Yong Huang, Singapore (SG); Fritz Lebowsky, St. Martin d'Uriage (FR)

(73) Assignees: STMicroelectronics Asia Pacific PTE., Ltd., Singapore (SG); STMicroelectronics (Grenoble2) SAS, Grenoble (FR)

( * ) Notice: Subject to any disclaimer, the term of this patent is extended or adjusted under 35 U.S.C. 154(b) by 658 days.

(21) Appl. No.: 12/925,223

(22) Filed: Oct. 15, 2010

(65) Prior Publication Data

US 2012/0092358 A1  Apr. 19, 2012

(51) Int. Cl.
| | |
|---|---|
| *G09G 5/00* | (2006.01) |
| *G09G 3/28* | (2013.01) |
| *H04N 5/208* | (2006.01) |
| *H04N 5/10* | (2006.01) |
| *H04N 5/00* | (2011.01) |
| *H04N 5/21* | (2006.01) |
| *G06K 9/40* | (2006.01) |
| *H04N 1/40* | (2006.01) |
| *H04N 1/409* | (2006.01) |

(52) U.S. Cl.
USPC ............ 345/611; 345/606; 345/690; 345/63; 348/252; 348/530; 348/606; 348/625; 348/629; 382/254; 382/266; 382/275; 358/3.27; 358/447; 358/448

(58) Field of Classification Search
USPC ......... 345/589, 600, 603, 606, 611–613, 618, 345/690, 691, 698, 58, 63, 77; 348/241–242, 252–253, 289, 354–356, 348/529–535, 538–541, 552, 605–607, 615, 348/625, 627–630; 358/1.9, 3.15, 3.26, 358/3.27, 447–448, 463, 525; 382/254, 382/266, 268, 260, 274–275, 276, 300, 199
See application file for complete search history.

(56) References Cited

U.S. PATENT DOCUMENTS

| | | | | |
|---|---|---|---|---|
| 5,662,113 | A * | 9/1997 | Liu | 600/443 |
| 6,373,992 | B1 * | 4/2002 | Nagao | 382/266 |
| 6,628,842 | B1 * | 9/2003 | Nagao | 382/266 |
| 6,754,398 | B1 * | 6/2004 | Yamada | 382/260 |
| 2005/0008251 | A1 * | 1/2005 | Chiang | 382/266 |
| 2010/0177249 | A1 * | 7/2010 | Ali | 348/625 |
| 2012/0147225 | A1 * | 6/2012 | Ishiga | 348/242 |

* cited by examiner

*Primary Examiner* — Wesner Sajous
(74) *Attorney, Agent, or Firm* — Munck Wilson Mandala, LLP

(57) ABSTRACT

A system for edge enhancement includes an input unit to receive an input signal Yin, a vertical enhancement unit to perform a vertical enhancement of an edge of the input signal Yin to generate an output YEV, and a horizontal enhancement unit to perform a horizontal enhancement of the edge of the input signal Yin to generate an output YEH. The system also includes a local gradient analysis unit to generate a local gradient direction GradDir and a local gradient magnitude GradMag based at least partly upon the input signal Yin, and a mixer to generate an output Yout by mixing the output YEV with the output YEH using the local gradient direction Grad-Dir. The system further includes an output unit to output the output Yout.

21 Claims, 9 Drawing Sheets

NOISE-ROBUST EDGE ENHANCEMENT SYSTEM AND METHOD FOR IMPROVED IMAGE SHARPNESS

TECHNICAL FIELD OF THE INVENTION

The present invention relates generally to video image processing and, more particularly, to a system and method for improving image sharpness in video display.

BACKGROUND OF THE INVENTION

Previous edge enhancement methods use a max-min refinement search circuit to detect maximum and minimum turning points closest to the center of the process window and use these turning points to determine values and locations of maximum and minimum pixels of the edge. With these determined maximum and minimum pixels, the input pixel is enhanced by a predefined enhancement curve controlled by a selective edge control.

In these methods, the maximum and minimum pixels of the edge are determined by the turning points. The turning points are detected by sign of the first derivative of three neighbor pixels. However, the use of turning point detection is sensitive to noise and will create a "striped noise" artifact, which is an unexpected striped noise observable between two narrow edges, in the enhanced result.

SUMMARY OF THE INVENTION

A system is provided. The system comprises an input unit configured to receive an input signal Yin, a vertical enhancement unit configured to perform a vertical enhancement of an edge of the input signal Yin to generate an output YEV, and a horizontal enhancement unit configured to perform a horizontal enhancement of the edge of the input signal Yin to generate an output YEH. The system also comprises a local gradient analysis unit configured to generate a local gradient direction GradDir and a local gradient magnitude GradMag based at least partly upon the input signal Yin, and a mixer configured to generate an output Yout by mixing the output YEV with the output YEH using the local gradient direction GradDir. The system further comprises an output unit configured to output the output Yout.

An apparatus is provided. The apparatus comprises an edge enhancement system. The system comprises an input unit configured to receive an input signal Yin, a vertical enhancement unit configured to perform a vertical enhancement of an edge of the input signal Yin to generate an output YEV, and a horizontal enhancement unit configured to perform a horizontal enhancement of the edge of the input signal Yin to generate an output YEH. The system also comprises a local gradient analysis unit configured to generate a local gradient direction GradDir and a local gradient magnitude GradMag based at least partly upon the input signal Yin, and a mixer configured to generate an output Yout by mixing the output YEV with the output YEH using the local gradient direction GradDir. The system further comprises an output unit configured to output the output Yout.

A method is provided. The method comprises receiving an input signal Yin at an input unit, performing a vertical enhancement of an edge of the input signal Yin at a vertical enhancement unit to generate an output YEV, and performing a horizontal enhancement of the edge of the input signal Yin at a horizontal enhancement unit to generate an output YEH. The method also comprises generating a local gradient direction GradDir and a local gradient magnitude GradMag based at least partly upon the input signal Yin at a local gradient analysis unit. The method further includes generating an output Yout at a mixer by mixing the output YEV with the output YEH using the local gradient direction GradDir, and outputting the output Yout at an output unit.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF EXEMPLARY EMBODIMENTS

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged video image processing system.

This disclosure provides a method and system for improving the quality of video images in terms of sharpness and depth perception. The improvements are carried out by steepening edge transitions using a noise robust method and system. The disclosed method and system solve problems associated with noise, jagged edges, and aliasing in high frequency region.

Figure 1:
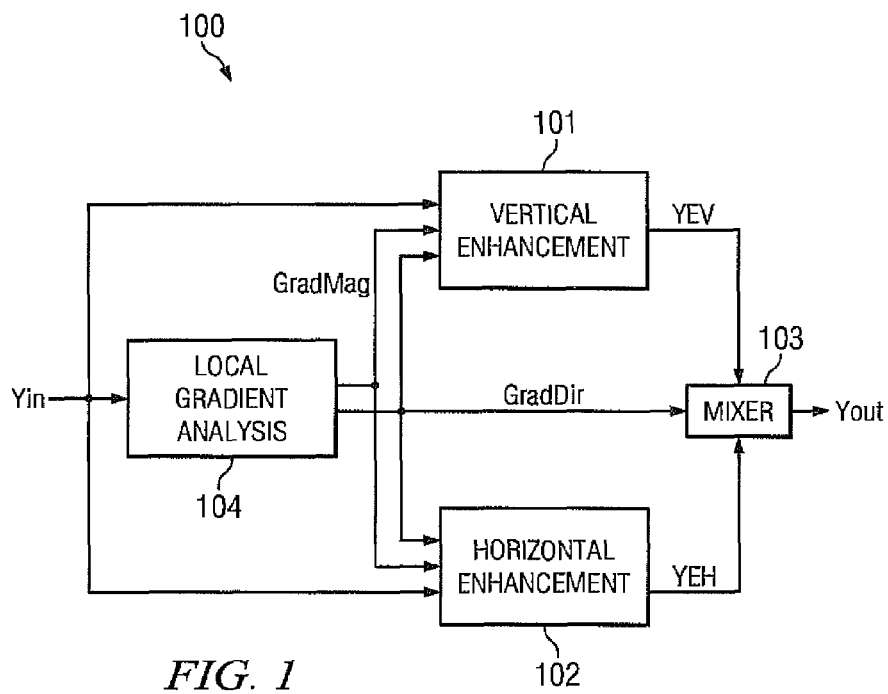
FIG. 1 is a block diagram of a noise-robust edge enhancement system according to an embodiment of this disclosure.

FIG. 1 is a block diagram of a noise-robust edge enhancement system 100 according to an embodiment of this disclosure.

As shown in FIG. 1, the edge enhancement system 100 receives a Yin input signal (luminance) in the YUV color space. Of course, one of ordinary skill in the art would recognize that the same system can also be applied to other input signals, e.g., chrominance. The Yin input signal is received at a vertical enhancement unit 101, a horizontal enhancement unit 102, and a local gradient analysis unit 104. In the edge enhancement system 100, vertical enhancement of the edge is carried out by the vertical enhancement unit 101 to generate an output YEV, and horizontal enhancement of the edge is carried out separately at the horizontal enhancement unit 102 to generate an output YEH. The mixer 103 receives the outputs YEV and YEH from the vertical enhancement unit 101 and the horizontal enhancement unit 102, respectively. The mixer 103 also receives a local gradient direction value (GradDir) from the local gradient analysis unit 104. The outputs YEV and YEH are mixed in the mixer 103 to get a final enhancement result. The mixing in the mixer 103 is adaptive to the local gradient direction value (GradDir) estimated in the local gradient analysis unit 104.

Figure 2A:
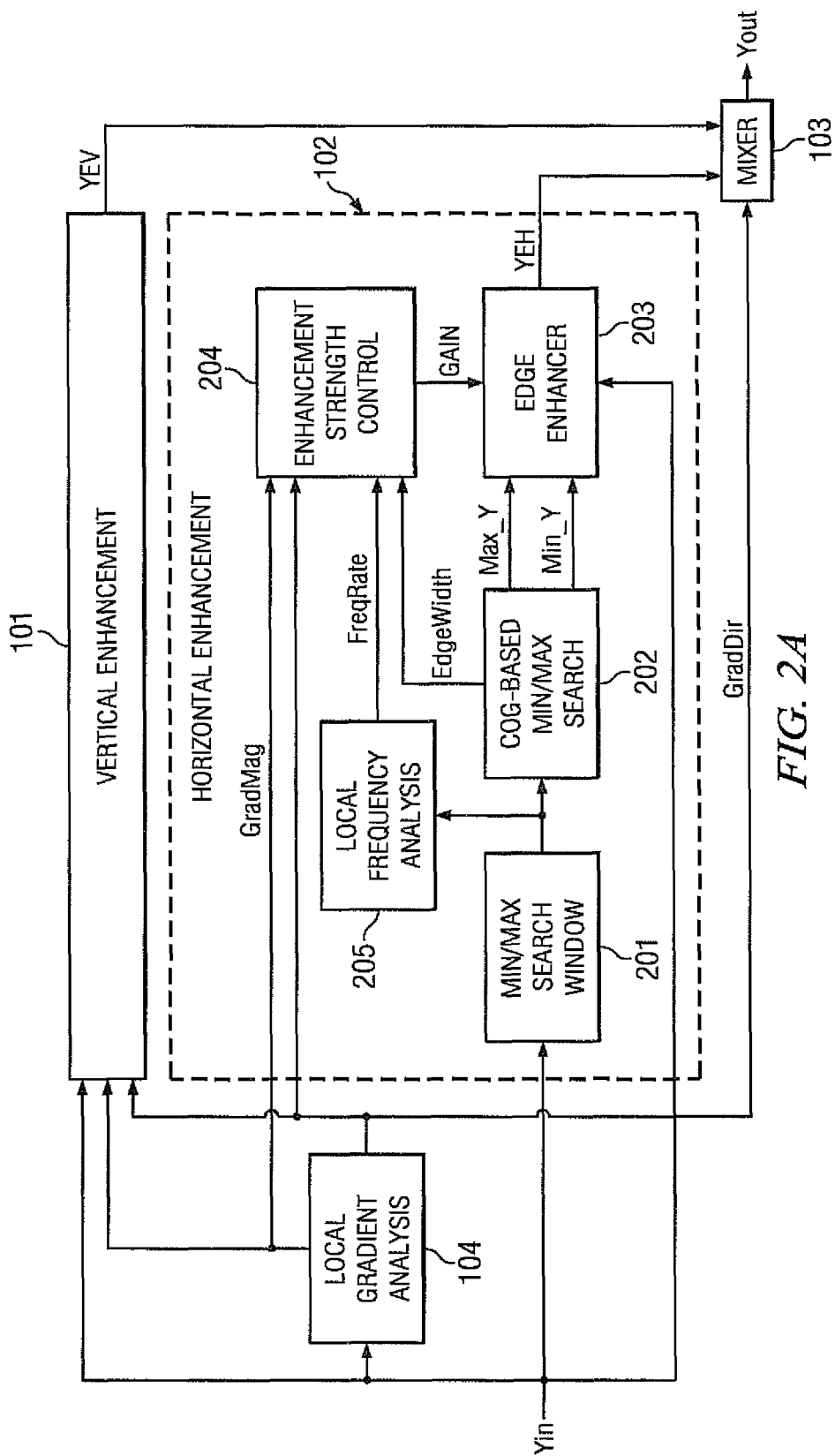
FIG. 2A is a block diagram of components for edge enhancement in the horizontal direction according to an embodiment of this disclosure.

FIG. 2A is a block diagram 210 of components for edge enhancement in the horizontal direction according to an embodiment of this disclosure.

As shown in FIG. 2A, the edge enhancement components include a min-max search window 201, a center of gravity (COG)-based min-max search unit 202, an edge enhancer 203 and an enhancement strength control unit 204. The edge enhancement components also include a local gradient analysis unit 104 and a local frequency analysis unit 205 that are used to extract local features, such as gradient magnitude (GradMag), gradient direction (GradDir) and frequency rate (FreqRate), used to control the enhancement strength in the enhancement strength control unit 204.

The min/max search window 201 is a one-dimensional analysis window, where the pixel at the center of the process window is referred to as the current input pixel Yin. The size of the analysis window will affect the range of maximum and minimum pixel values detected and thus affects the effectiveness of the edge enhancement. The guideline for selecting a sufficient window size is whether the window is large enough to cover the edges of interest. Normally, for a rescaled standard definition (SD) or high definition (HD) input source, the window size should be larger than SD input source. For example, the window size is 9 pixels for an SD source while the window size can be 13 pixels for a rescaled SD or HD source.

The COG-based min-max search unit 202 detects the local minimum and maximum pixels within the analysis window based on the COG position of the left and right parts of the window.

Figure 3:
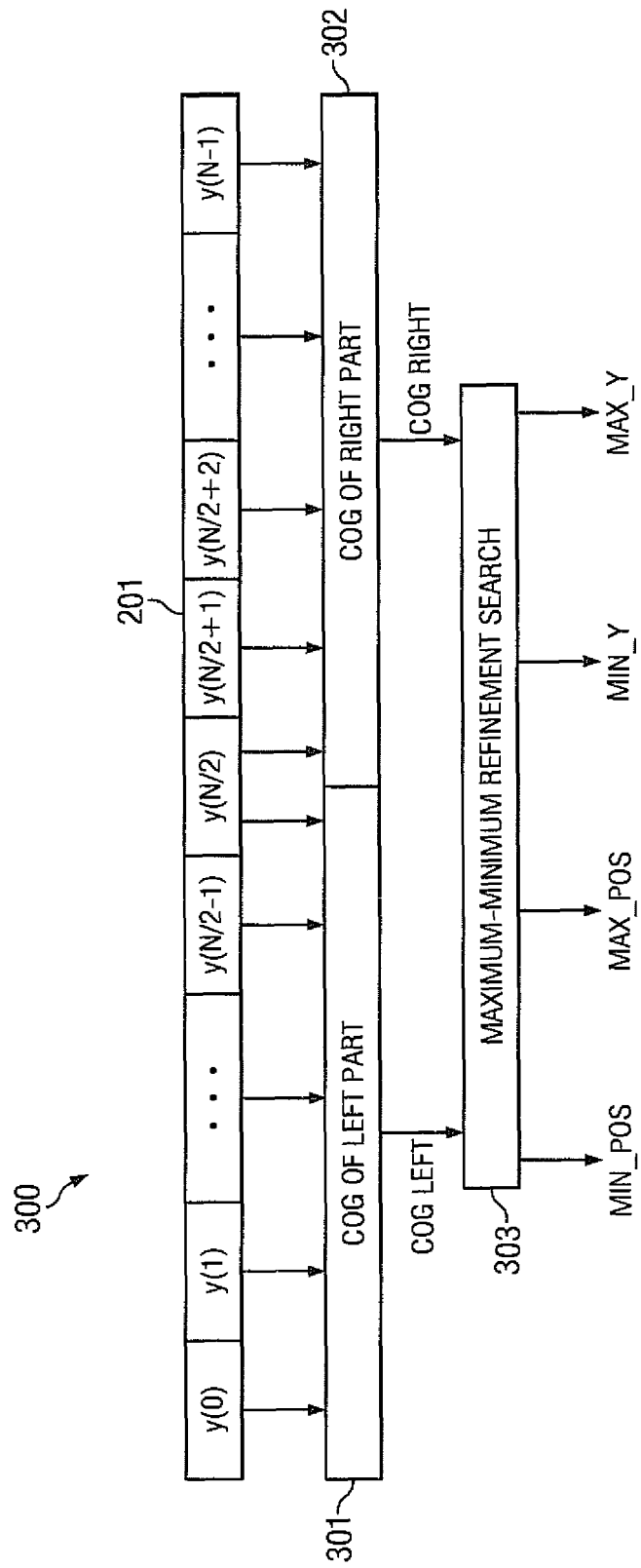
FIG. 3 illustrates a center of gravity (COG)-based minimum/maximum search according to an embodiment of this disclosure.

FIG. 3 illustrates a COG-based minimum/maximum search 300 according to an embodiment of this disclosure.

The COG-based min-max search unit 202 performs a search process. As shown in FIG. 3, the COG position of the left part (COG_Left) of the min-max search window 201 is determined by a COG of left part unit 301 of the COG-based min-max search unit 202. The COG position of the right part (COG_Right) of the min-max search window 201 is determined by a COG of right part unit 302 of the COG-based min-max search unit 202.

In a particular embodiment, the COG positions are estimated by units 301 and 302 as shown in Equations 1 and 2 below:

$$COGPos_{left} = \frac{\sum_{i=0}^{N/2} i*|y(i) - MeanY|}{\sum_{i=0}^{N/2} |y(i) - MeanY|}, \text{ and} \quad [\text{Eqn. 1}]$$

$$COGPos_{right} = \frac{\sum_{i=N/2}^{N-1} i*|y(i) - MeanY|}{\sum_{i=N/2}^{N-1} |y(i) - MeanY|}, \quad [\text{Eqn. 2}]$$

where N is the size of the min-max search window 201, y(i) is the pixel value at position i, and MeanY is the average value of the pixels in the min-max search window 201 and is calculated as shown in Equation 3 below:

$$MeanY = \frac{1}{N}\sum_{i=0}^{N-1} y(i). \quad [\text{Eqn. 3}]$$

Of course one of ordinary skill in the art would recognize that other methods of calculating the COG positions may be utilized without departing from the scope of this disclosure.

After calculating the COG position of the left and right parts, the minimum and maximum pixels are estimated in a maximum-minimum refinement search unit 303 of the COG-based min-max search unit 202. In a particular embodiment, the refinement search of maximum and minimum pixel values (MAX_Y, MIN_Y) and their positions (MAX_POS, MIN_POS) are defined as shown in Equations 4 to 7 below:

$$MAX\_POS = \quad [\text{Eqn. 4}]$$
$$\begin{cases} MAX(y(i)|_{i=COGPos_{left}:N/2}) & \text{if } (y(N/2+1) < y(N/2-1)) \\ MAX(y(i)|_{i=N/2:COGPos_{right}}) & \text{else,} \end{cases}$$

$$MIN\_POS = \quad [\text{Eqn. 5}]$$
$$\begin{cases} MIN(y(i)|_{i=COGPos_{left}:N/2}) & \text{if } (y(N/2+1) > y(N/2-1)) \\ MIN(y(i)|_{i=N/2:COGPos_{right}}) & \text{else,} \end{cases}$$

$$MAX\_Y = y(MAX\_POS), \text{ and} \quad [\text{Eqn. 6}]$$

$$MIN\_Y = y(MIN\_POS). \quad [\text{Eqn. 7}]$$

Of course one of ordinary skill in the art would recognize that other methods of calculating the maximum and minimum pixel values (MAX_Y, MIN_Y) and their positions (MAX_POS, MIN_POS) may be utilized without departing from the scope of this disclosure.

Using the maximum and minimum positions, an edge width information (EdgeWidth) is obtained as shown in Equation 8 below:

$$EdgeWidth=abs(MAX\_POS-MIN\_POS). \quad [\text{Eqn. 8}]$$

Of course one of ordinary skill in the art would recognize that other methods of calculating the edge width information may be utilized without departing from the scope of this disclosure.

This parameter is used as a control parameter in the enhancement strength control unit 204.

The outputs of the COG-based min-max search unit 202, the maximum value (MAX_Y), the minimum value (MIN_Y) and the input Yin are then fed into the edge enhancer 203. In the edge enhancer 203, an enhancement curve is defined according to the maximum and minimum pixel values (MAX_Y, MIN_Y). This curve is controlled by a control parameter (Gain) to control the strength of the enhancement. One of ordinary skill in the art would be familiar with the concept of enhancement curves.

Figure 4:
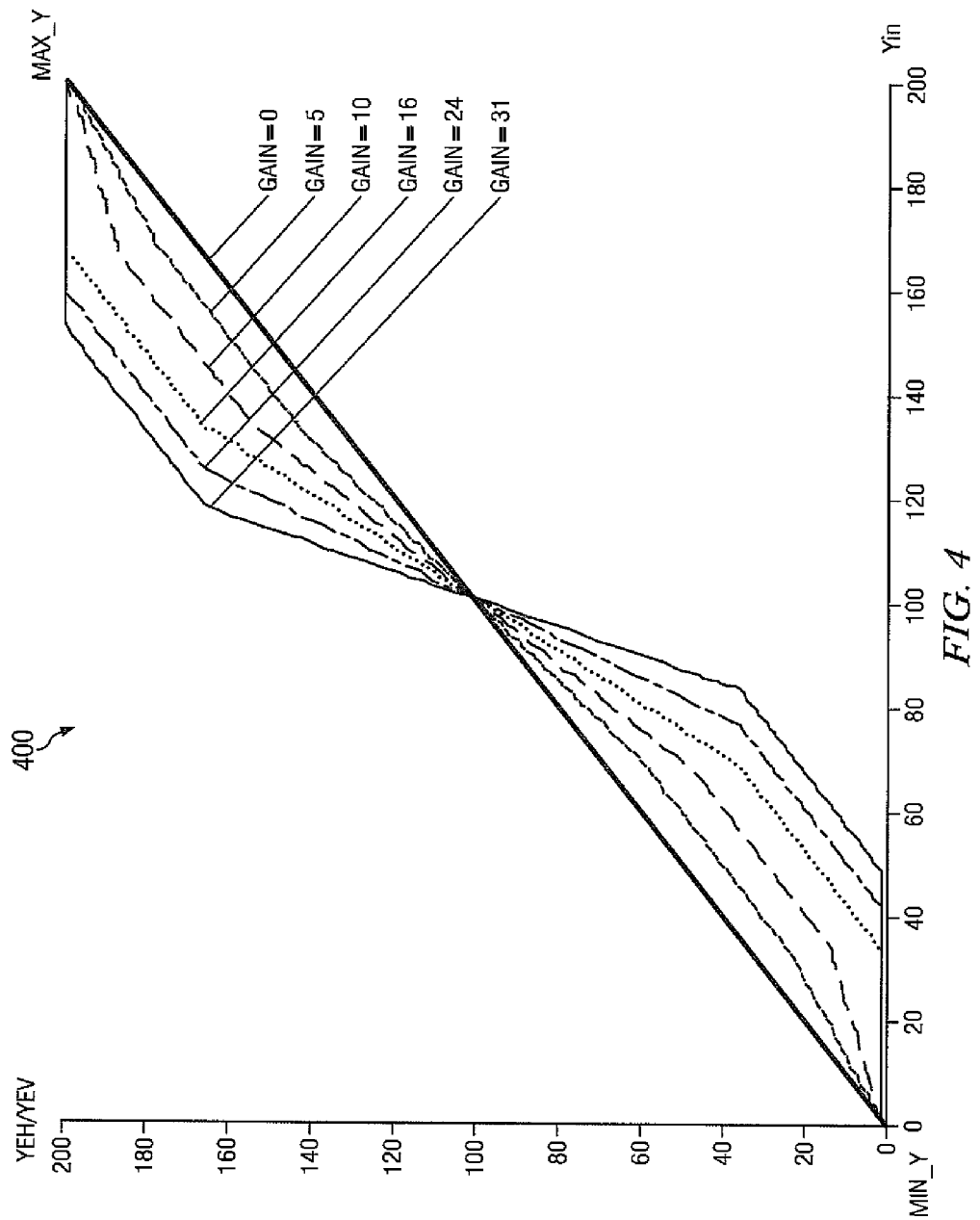
FIG. 4 shows a plurality of edge enhancement curves with different strength control values according to an embodiment of this disclosure.

FIG. 4 shows a plurality of edge enhancement curves 400 with different strength control values according to an embodiment of this disclosure.

In this example, the minimum and maximum values are 0 and 200.

Figure 5:
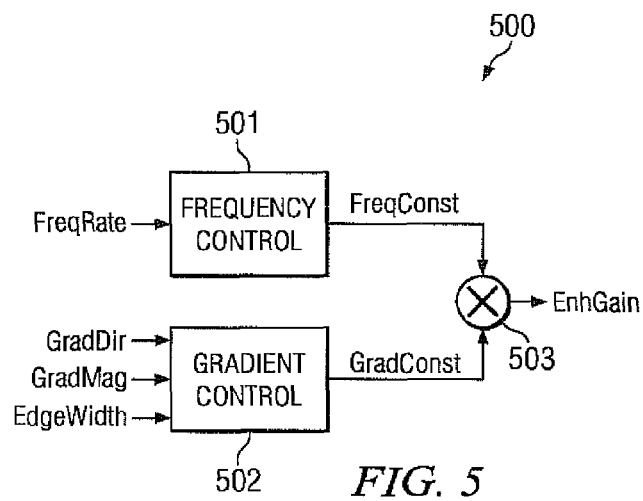
FIG. 5 is a block diagram of components in an enhancement strength control unit according to an embodiment of this disclosure.
Figure 6:
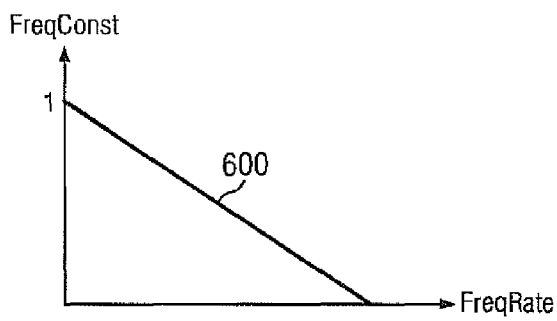
FIG. 6 illustrates a frequency control curve according to an embodiment of this disclosure.

FIG. 5 is a block diagram 500 of components in an enhancement strength control unit according to an embodiment of this disclosure.

The control parameter (Gain) of the edge enhancer 203 is generated in the enhancement strength control unit 204. As shown in FIG. 5, the enhancement strength control unit 204 includes a frequency control unit 501, a gradient control unit 502 and a multiplier 503. The frequency control unit 501 uses the local frequency information (FreqRate) to generate a control parameter (FreqConst). The frequency control unit 501 aims to reduce the aliasing problem in the high frequency region. In a particular embodiment, the relationship between FreqRate and FreqConst can be expressed by the curve 600 shown in FIG. 6 and by Equation 9 below:

$$FreConst = 1 - FreqRate. \quad [Eqn. 9]$$

Of course one of ordinary skill in the art would recognize that other relationships between FreqRate and FreqConst may be realized without departing from the scope of this disclosure.

The gradient control unit 502 combines the features of gradient magnitude (GradMag), gradient direction (GradDir) and edge width (EdgeWidth) to generate a control parameter GradConst as shown in Equation 10 below:

$$GradConst = f(GradMag, GradDir, EdgeWidth), \quad [Eqn. 10]$$

where f(.) is a combination function that can be pre-defined by users.

Figure 7:
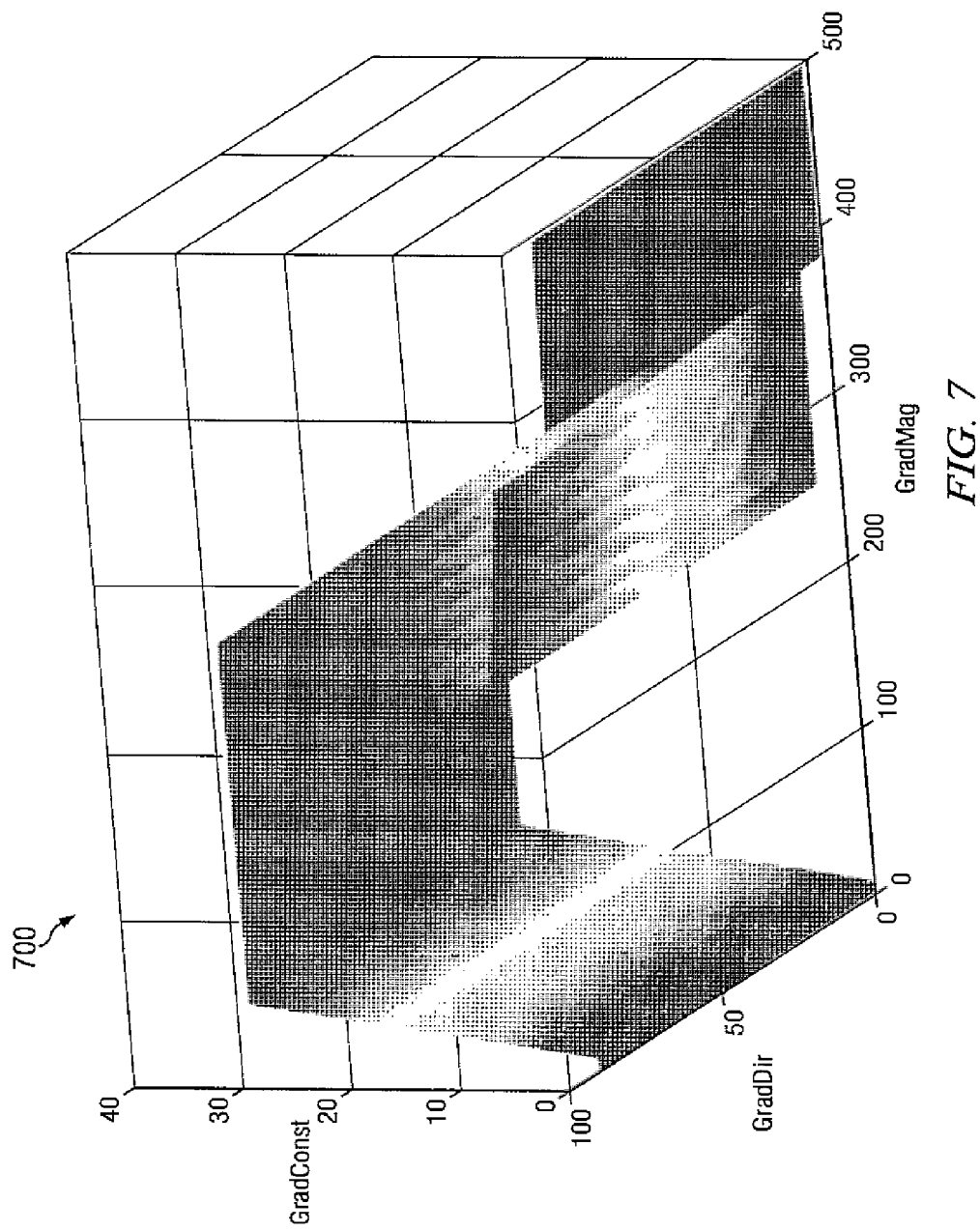
FIG. 7 illustrates a combined gradient control curve according to an embodiment of this disclosure.

FIG. 7 illustrates a combined gradient control curve 700 according to an embodiment of this disclosure.

FIG. 7 illustrates a three-dimensional example of a combination function 700 in horizontal enhancement. As shown in FIG. 7, the gradient direction value (GradDir) is quantized in the range of [0,90]. In a particular embodiment, the GradMag' is obtained as shown in Equation 11 below:

$$GradMag' = GradMag * N/EdgeWidth, \quad [Eqn. 11]$$

where N is the number of pixels in the analysis window.

Of course one of ordinary skill in the art would recognize that other methods of calculating the GradMag' may be utilized without departing from the scope of this disclosure.

From FIG. 7, it can be seen that for the edges with the lower and higher gradient magnitude values, the enhancement strength is lower. For the edges with the mid gradient magnitude values, the enhancement strength is higher. This reduces the unnatural effect in the smooth region and higher edge region. Also, for the edges with near vertical directions (lower gradient directions), the enhancement strength is lower. This reduces the jaggedness along these edges.

Referring to FIG. 5, the outputs of the frequency control unit 501 and the gradient control unit 502 are combined together in the multiplier 503 to get the strength control parameter (Gain) as shown in Equation 12 below:

$$Gain = FreqConst * GradConst. \quad [Eqn. 12]$$

Referring to FIG. 2A, the local frequency analysis unit 205 is used to estimate the local frequency information (FreqRate) and control the enhancement strength. In a particular embodiment, the local frequency information is obtained as shown in Equations 13 and 14 below:

$$FreqRate = \frac{1}{N} \sum_{i=0}^{N-1} S(i) \oplus S(i+1), \text{ and} \quad [Eqn. 13]$$

$$S(i) = \text{Sign}(y(i) - MeanY), \quad [Eqn. 14]$$

where Sign(.) is the sign function, i.e., $$\text{Sign}(x) = \begin{cases} 1 & \text{if } (x > 0) \\ 0 & \text{if } (x = 0) \\ -1 & \text{if } (x < 0), \end{cases}$$

⊕ is Exclusive-Or, i.e., $$a \oplus b = \begin{cases} 1 & \text{if } (a \ne b) \\ 0 & \text{else} \end{cases}, \text{ and}$$

$$MeanY = \frac{1}{N} \sum_{i=0}^{N-1} y(i).$$

Of course one of ordinary skill in the art would recognize that other methods of calculating the local frequency information may be utilized without departing from the scope of this disclosure.

Figure 8:
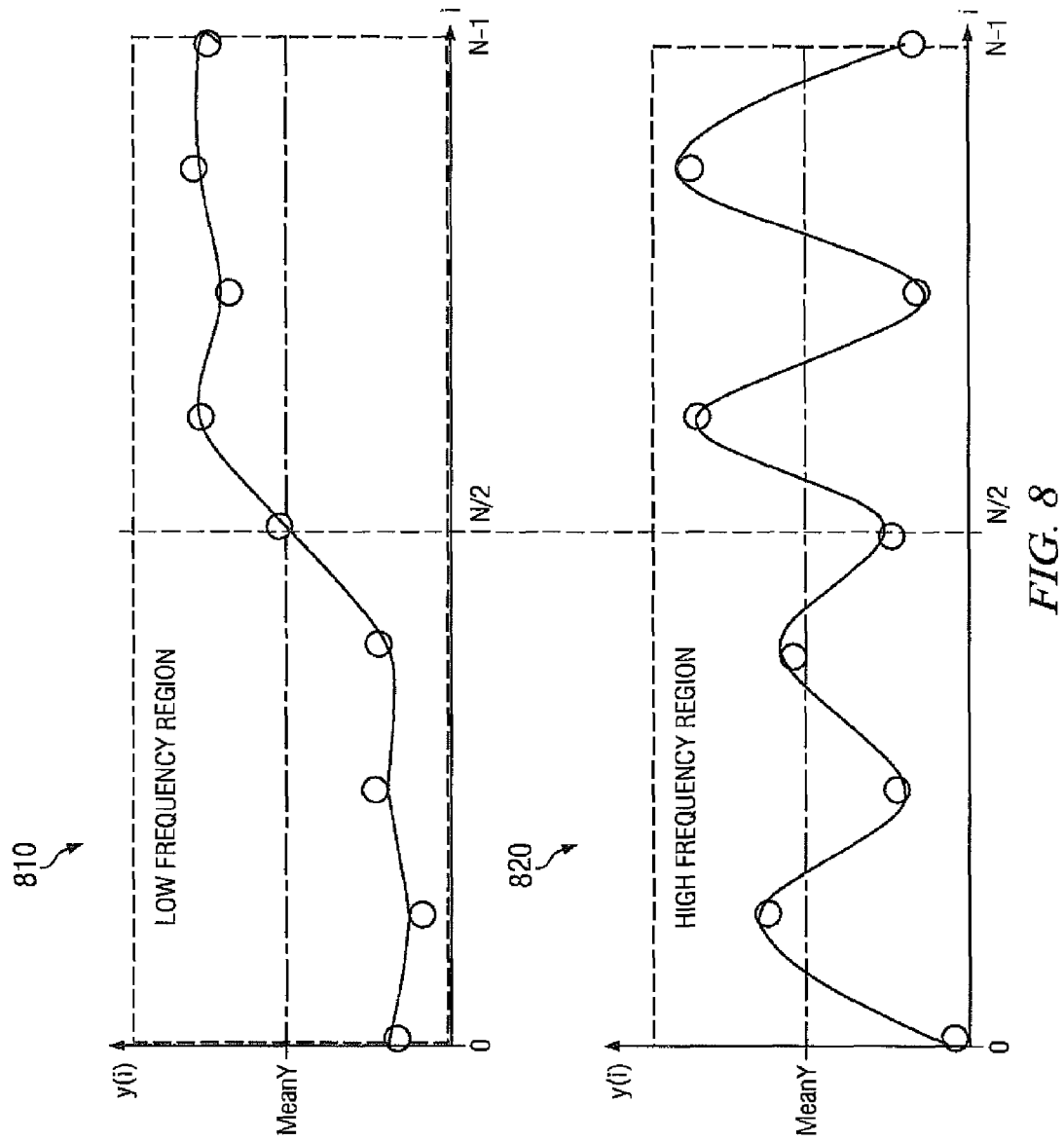
FIG. 8 shows an example of a low frequency region and a high frequency region according to an embodiment of this disclosure.

FIG. 8 shows an example of a low frequency region 810 and a high frequency region 820 according to an embodiment of this disclosure.

Figure 9:
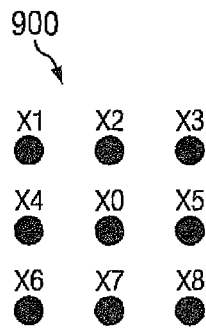
FIG. 9 illustrates neighborhood pixels for local gradient estimation according to an embodiment of this disclosure.

FIG. 9 illustrates neighborhood pixels 900 for local gradient estimation according to an embodiment of this disclosure.

The local gradient analysis unit 104 estimates the gradient magnitude and gradient direction in a 3×3 neighborhood window as shown in FIG. 9. In a particular embodiment, the gradient magnitude in horizontal direction (GradMagX) and vertical direction (GradMagY) are calculated as shown in Equations 15 to 17 below:

$$GradMagX = (X1 + 2*X2 + X3 - (X6 + 2*X7 + X8))/4, \text{ and} \quad [Eqn. 15]$$

$$GradMagY = (X1 + 2*X4 + X6 - (X3 + 2*X5 + X8))/4. \quad [Eqn. 16]$$

and the Gradient Direction (GradDir) is obtained by:

$$GradDir = \arctan((GradMagY)/(GradMagX)), \quad [Eqn. 17]$$

where arctan(y/x) is an inverse tangent function.

Of course one of ordinary skill in the art would recognize that other methods of calculating the gradient magnitude in horizontal direction (GradMagX) and vertical direction (GradMagY) may be utilized without departing from the scope of this disclosure.

The gradient magnitude in horizontal direction (GradMagX) will be used in horizontal enhancement while the gradient magnitude in vertical direction (GradMagY) will be used in vertical enhancement.

Referring to FIG. 2A, the outputs of horizontal enhancement (YEH) and vertical enhancement (YEV) are finally mixed in the mixer 103 to get the final enhancement output (Yout). In a particular embodiment, the mixing is adaptive to the gradient direction as shown in Equation 18 below:

$$Yout=(GradDir*YEH+(90-GradDir)*YEV)/90. \quad [\text{Eqn. 18}]$$

Of course one of ordinary skill in the art would recognize that other methods of mixing horizontal enhancement (YEH) and vertical enhancement (YEV) may be utilized without departing from the scope of this disclosure.

Figure 2B:
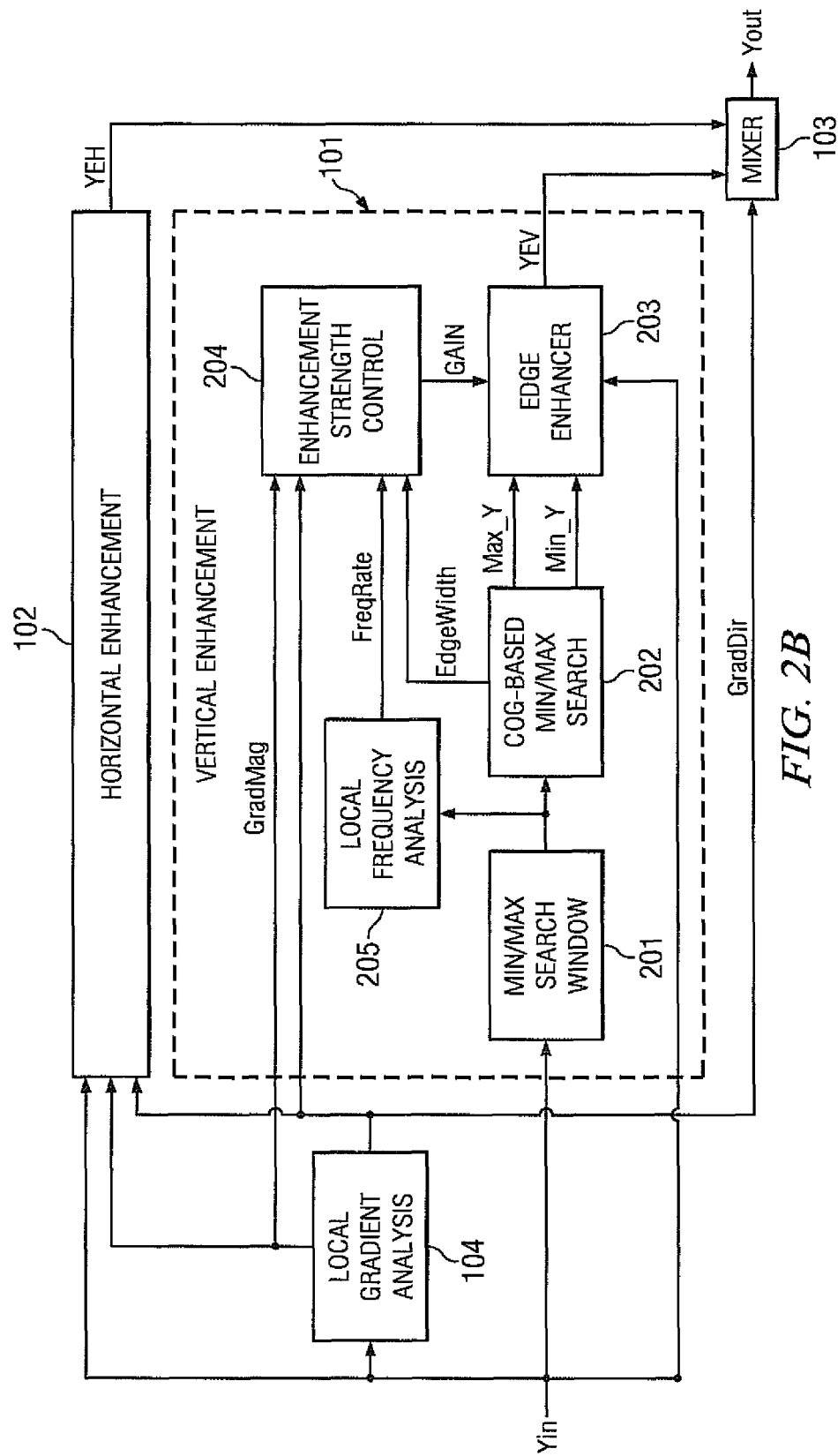
FIG. 2B is a block diagram of components for edge enhancement in the vertical direction according to an embodiment of this disclosure.

FIG. 2B is a block diagram of components for edge enhancement in the vertical direction according to an embodiment of this disclosure.

The enhancement of edges in the vertical direction is the same as the enhancement of edges in the horizontal direction as provided in the description of FIG. 2A.

Figure 10:
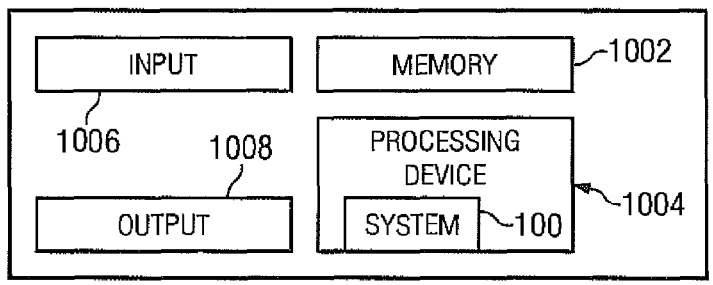
FIG. 10 illustrates an apparatus incorporating a noise-robust edge enhancement system according to an embodiment of this disclosure this disclosure.

FIG. 10 illustrates an apparatus 1000 incorporating the noise-robust edge enhancement system 100 according to an embodiment of this disclosure this disclosure.

The apparatus 1000 includes a memory 1002, a processing unit 1004, an input unit 1006, and an output unit 1008 that are configured to implement the edge enhancement technique described herein. The memory 1002 may be fixed or removable and includes computer code for execution by the processing unit 1004. The processing unit 1004 includes the noise-robust edge enhancement system 100 and any suitable processing system or unit, such as a microprocessor, microcontroller, digital signal processor, application specific integrated circuit, or field programmable gate array. The input and output units 1006 and 1008 include any suitable structures for receiving or transmitting information.

In some embodiments, the input unit 1006 is configured to receive the Yin input signal. The processing unit 1004 is configured to implement the edge enhancement technique described in this disclosure. The output unit 1008 is configured to output the final enhancement output (Yout).

While the apparatus 1000 is shown using a processing unit 1004 and a memory 1002 that includes program code, other embodiments could be used. For example, the apparatus 1000 or the processing unit 1004 may be implemented with fixed or programmable logic configured to perform the methods of this disclosure.

Figure 11:
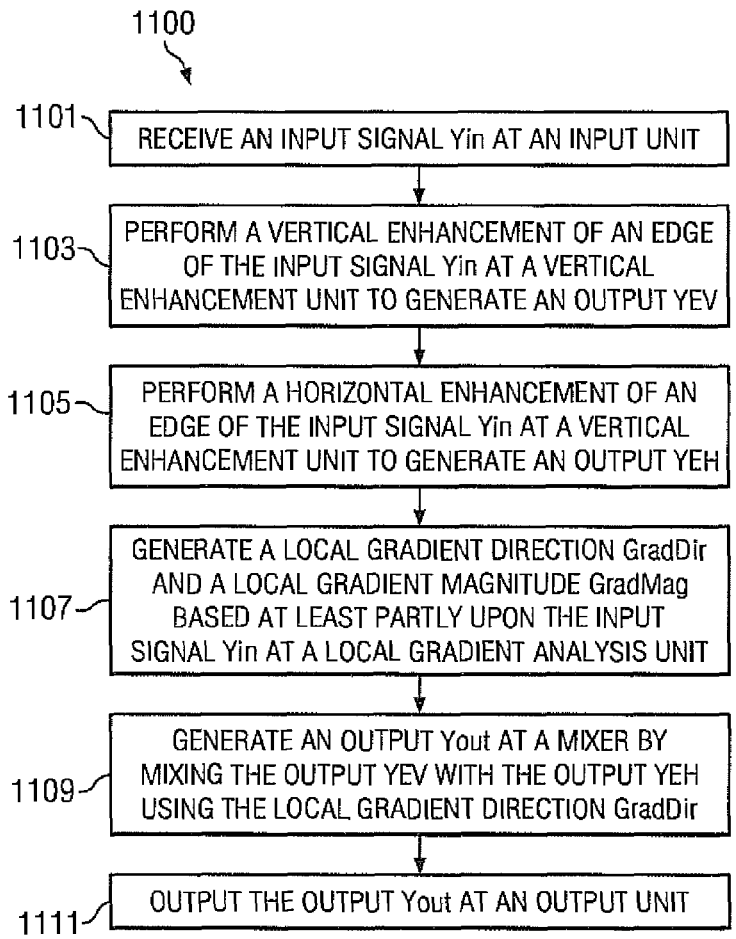
FIG. 11 illustrates a method of noise-robust edge enhancement according to an embodiment of this disclosure.

FIG. 11 illustrates a method 1100 of noise-robust edge enhancement according to an embodiment of this disclosure.

As shown in FIG. 11, method 1100 includes receiving an input signal Yin at an input unit (block 1101), performing a vertical enhancement of an edge of the input signal Yin at a vertical enhancement unit to generate an output YEV (block 1103), and performing a horizontal enhancement of the edge of the input signal Yin at a horizontal enhancement unit to generate an output YEH (block 1105). Method 1100 also comprises generating a local gradient direction GradDir and a local gradient magnitude GradMag based at least partly upon the input signal Yin at a local gradient analysis unit (block 1107) and generating an output Yout at a mixer by mixing the output YEV with the output YEH using the local gradient direction GradDir (block 1109). Method 1100 further comprises outputting the output Yout at an output unit (block 1111).

Figure 12:
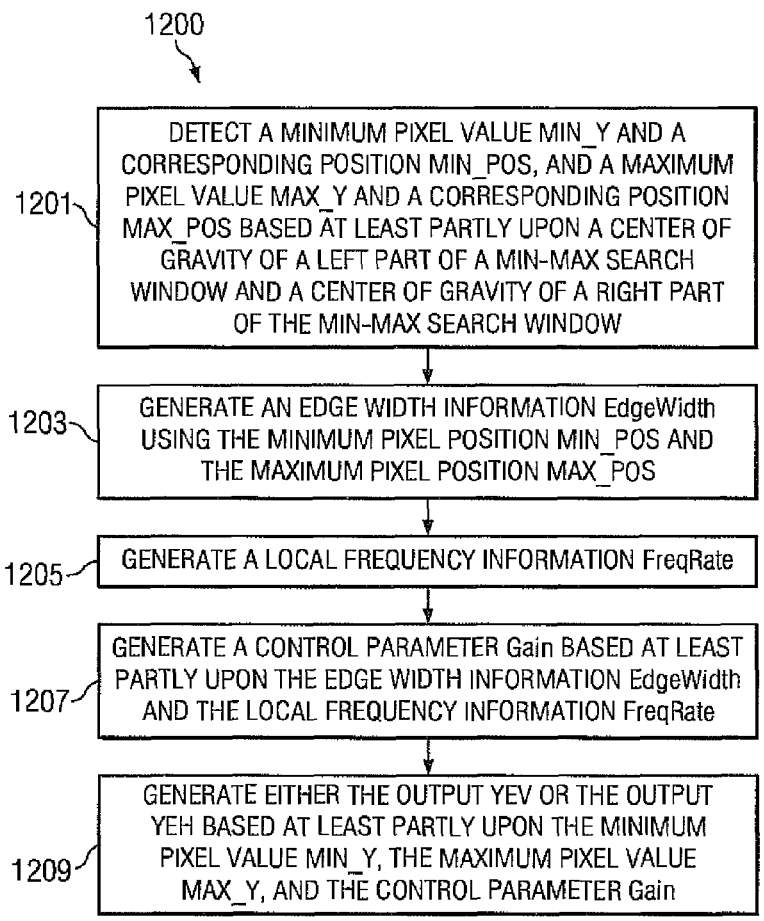
FIG. 12 illustrates a method of generating an output YEV or an output YEH according to an embodiment of this disclosure.

FIG. 12 illustrates a method 1200 of generating an output YEV or an output YEH according to an embodiment of this disclosure.

As shown in FIG. 12, method 1200 comprises detecting a minimum pixel value MIN_Y and a corresponding position MIN_POS, and a maximum pixel value MAX_Y and a corresponding position MAX_POS based at least partly upon a center of gravity of a left part of a min-max search window and a center of gravity of a right part of the min-max search window (block 1201). Method 1200 also comprises generating an edge width information EdgeWidth using the minimum pixel position MIN_POS and the maximum pixel position MAX_POS (block 1203) and generating a local frequency information FreqRate (block 1205). Method 1200 further comprises generating a control parameter Gain based at least partly upon the edge width information EdgeWidth and the local frequency information FreqRate (block 1207) and generating either the output YEV or the output YEH based at least partly upon the minimum pixel value MIN_Y, the maximum pixel value MAX_Y, and the control parameter Gain (block 1209).

Figure 13:
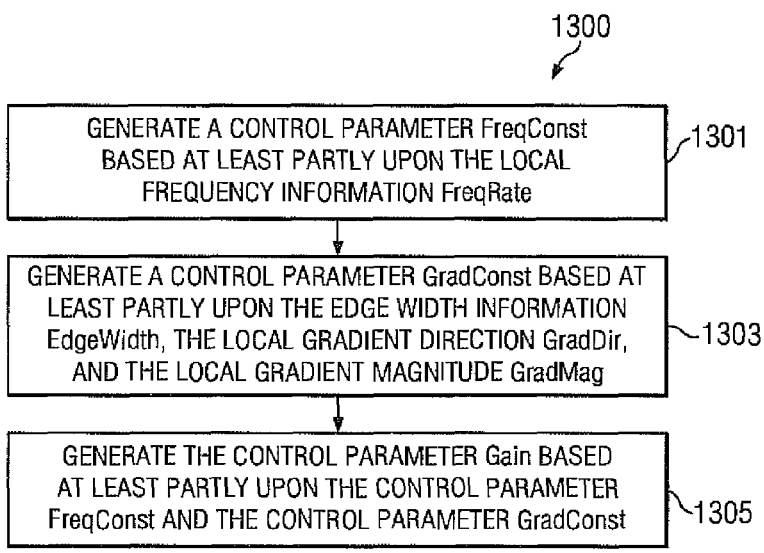
FIG. 13 illustrates a method of generating a control parameter Gain according to an embodiment of this disclosure.

FIG. 13 illustrates a method 1300 of generating a control parameter Gain according to an embodiment of this disclosure.

As shown in FIG. 13, method 1300 comprises generating a control parameter FreqConst based at least partly upon the local frequency information FreqRate (block 1301) and generating a control parameter GradConst based at least partly upon the edge width information EdgeWidth, the local gradient direction GradDir, and the local gradient magnitude GradMag (block 1303). Method 1300 also comprises generating the control parameter Gain based at least partly upon the control parameter FreqConst and the control parameter GradConst (block 1305).

The local minimum and maximum pixels detection of this disclosure is based on the position of the center of gravity (COG). This is a noise-immune approach for finding minimum and maximum pixels used in edge enhancement, and solves the problem of noise sensitivity associated with previous methods.

Enhancement strength is adaptive to a combination of local features such as gradient magnitude, gradient direction and edge width. This reduces the edge jaggedness and unnatural effects in the smooth region.

Local frequency estimation and constraints reduce the aliasing in high frequency region.

Mixing of the horizontal and vertical enhancement results is adaptive to the local gradient direction. This reduces the edge jaggedness and aliasing problems, especially near the horizontal and vertical edges.

The methods and systems of this disclosure can be applied to a generic video image processing system. The methods and systems can be applied on luminance and chrominance signals separately in the YUV color space or applied in R, G, B signals separately in the RGB color space. This enhances the edge in the horizontal and the vertical directions simultaneously and then mixes the results adaptive to the gradient direction.

Although the present disclosure has been described with an exemplary embodiment, various changes and modifications may be suggested to one skilled in the art. It is intended that the present disclosure encompass such changes and modifications as fall within the scope of the appended claims.

What is claimed is:
1. A system, comprising:
an input unit configured to receive an input signal Yin;
a vertical enhancement unit configured to perform a vertical enhancement of an edge of the input signal Yin to generate an output YEV;
a horizontal enhancement unit configured to perform a horizontal enhancement of the edge of the input signal Yin to generate an output YEH;
a local gradient analysis unit configured to generate a local gradient direction GradDir and a local gradient magnitude GradMag based at least partly upon the input signal Yin;

a mixer configured to generate an output Yout by mixing the output YEV with the output YEH using the local gradient direction GradDir, wherein a strength of each of the vertical and the horizontal enhancements of the edge of the input signal Yin used to generate the output Yout is adaptive by the local gradient direction GradDir as a multiplier; and an output unit configured to output the output Yout.

2. A system, comprising:

an input unit configured to receive an input signal Yin;

a vertical enhancement unit configured to perform a vertical enhancement of an edge of the input signal Yin to generate an output YEV;

a horizontal enhancement unit configured to perform a horizontal enhancement of the edge of the input signal Yin to generate an output YEH;

a local gradient analysis unit configured to generate a local gradient direction GradDir and a local gradient magnitude GradMag based at least partly upon the input signal Yin;

a mixer configured to generate an output Yout by mixing the output YEV with the output YEH using the local gradient direction GradDir; and an output unit configured to output the output Yout, wherein the output Yout is generated by the mixer as follows:

Yout=(GradDir*YEH+(90−GradDir)*YEV)/90.

3. A system, comprising:

an input unit configured to receive an input signal Yin;

a vertical enhancement unit configured to perform a vertical enhancement of an edge of the input signal Yin to generate an output YEV;

a horizontal enhancement unit configured to perform a horizontal enhancement of the edge of the input signal Yin to generate an output YEH;

a local gradient analysis unit configured to generate a local gradient direction GradDir and a local gradient magnitude GradMag based at least partly upon the input signal Yin;

a mixer configured to generate an output Yout by mixing the output YEV with the output YEH using the local gradient direction GradDir; and an output unit configured to output the output Yout, wherein the vertical enhancement unit and the horizontal enhancement unit each comprise:

a min-max search window having a left part and a right part;

a center of gravity (COG)-based min-max search unit configured to:

detect a minimum pixel value MIN_Y and a corresponding position MIN_POS, and a maximum pixel value MAX_Y and a corresponding position MAX_POS based at least partly upon a center of gravity of the left part of the min-max search window and a center of gravity of the right part of the min-max search window, and generate an edge width information EdgeWidth using the minimum pixel position MIN POS and the maximum pixel position MAX_POS;

a local frequency analysis unit configured to generate a local frequency information FreqRate;

an enhancement strength control unit configured to generate a control parameter Gain based at least partly upon the edge width information EdgeWidth and the local frequency information FreqRate; and an edge enhancer configured to generate either the output YEV or the output YEH based at least partly upon the minimum pixel value MIN_Y, the maximum pixel value MAX_Y, and the control parameter Gain.

4. The system in accordance with claim 3, wherein the enhancement strength control unit comprises:

a frequency control unit configured to generate a control parameter FreqConst based at least partly upon the local frequency information FreqRate;

a gradient control unit configured to generate a control parameter GradConst based at least partly upon the edge width information EdgeWidth, the local gradient direction GradDir, and the local gradient magnitude GradMag; and a multiplier configured to generate the control parameter Gain based at least partly upon the control parameter FreqConst and the control parameter GradConst.

5. The system in accordance with claim 3, wherein the center of gravity of the left part of the min-max search window and the center of gravity of the right part of the min-max search window are determined by the (COG)-based min-max search unit as follows:

$$COGPos_{left} = \frac{\sum_{i=0}^{N/2} i*|y(i) - MeanY|}{\sum_{i=0}^{N/2} |y(i) - MeanY|}, \text{ and}$$

$$COGPos_{right} = \frac{\sum_{i=N/2}^{N-1} i*|y(i) - MeanY|}{\sum_{i=N/2}^{N-1} |y(i) - MeanY|},$$

where N is a size of the min-max search window, y(i) is a pixel value at position i, and MeanY is an average value of the pixels in the min-max search window and is calculated as follows:

$$MeanY = \frac{1}{N}\sum_{i=0}^{N-1} y(i).$$

6. The system in accordance with claim 3, wherein the minimum pixel value MIN_Y and the maximum pixel value MAX_Y are determined by the (COG)-based min-max search unit as follows:

$$MAX\_POS = \begin{cases} MAX(y(i)|_{i=COGPos_{left}:N/2}) & \text{if } (y(N/2+1) < y(N/2-1)) \\ MAX(y(i)|_{i=N/2:COGPos_{right}}) & \text{else,} \end{cases}$$

$$MIN\_POS = \begin{cases} MIN(y(i)|_{i=COGPos_{left}:N/2}) & \text{if } (y(N/2+1) > y(N/2-1)) \\ MIN(y(i)|_{i=N/2:COGPos_{right}}) & \text{else,} \end{cases}$$

MAX_Y = y(MAX_POS), and

MIN_Y = y(MIN_POS).

7. The system in accordance with claim 3, wherein the local frequency information FreqRate is determined by the local frequency analysis unit as follows:

$$FreqRate = \frac{1}{N}\sum_{i=0}^{N-1} S(i) \oplus S(i+1),$$

$$S(i) = \text{Sign}(y(i) - MeanY),$$

where Sign(.) is a sign function $$\text{Sign}(x) = \begin{cases} 1 & \text{if } (x > 0) \\ 0 & \text{if } (x = 0) \\ -1 & \text{if } (x < 0), \end{cases}$$

$\oplus$ is an Exclusive-Or function $$a \oplus b = \begin{cases} 1 & \text{if } (a \neq b) \\ 0 & \text{else} \end{cases}, \text{ and}$$

$$MeanY = \frac{1}{N}\sum_{i=0}^{N-1} y(i).$$

8. An apparatus, comprising:
an edge enhancement system comprising:
   an input unit configured to receive an input signal Yin;
   a vertical enhancement unit configured to perform a vertical enhancement of an edge of the input signal Yin to generate an output YEV;
   a horizontal enhancement unit configured to perform a horizontal enhancement of the edge of the input signal Yin to generate an output YEH;
   a local gradient analysis unit configured to generate a local gradient direction GradDir and a local gradient magnitude GradMag based at least partly upon the input signal Yin;
   a mixer configured to generate an output Yout by mixing the output YEV with the output YEH using the local gradient direction GradDir, wherein a strength of each of the vertical and the horizontal enhancements of the edge of the input signal Yin used to generate the output Yout is adaptive by the local gradient direction GradDir as a multiplier; and
   an output unit configured to output the output Yout.

9. An apparatus, comprising:
an edge enhancement system comprising:
   an input unit configured to receive an input signal Yin;
   a vertical enhancement unit configured to perform a vertical enhancement of an edge of the input signal Yin to generate an output YEV;
   a horizontal enhancement unit configured to perform a horizontal enhancement of the edge of the input signal Yin to generate an output YEH;
   a local gradient analysis unit configured to generate a local gradient direction GradDir and a local gradient magnitude GradMag based at least partly upon the input signal Yin;
   a mixer configured to generate an output Yout by mixing the output YEV with the output YEH using the local gradient direction GradDir; and
   an output unit configured to output the output Yout,
wherein output Yout is generated by the mixer as follows:

Yout=(GradDir*YEH+(90−GradDir)*YEV)/90.

10. An apparatus, comprising:
an edge enhancement system comprising:
   an input unit configured to receive an input signal Yin;
   a vertical enhancement unit configured to perform a vertical enhancement of an edge of the input signal Yin to generate an output YEV;
   a horizontal enhancement unit configured to perform a horizontal enhancement of the edge of the input signal Yin to generate an output YEH;
   a local gradient analysis unit configured to generate a local gradient direction GradDir and a local gradient magnitude GradMag based at least partly upon the input signal Yin;
   a mixer configured to generate an output Yout by mixing the output YEV with the output YEH using the local gradient direction GradDir; and
   an output unit configured to output the output Yout,
wherein the vertical enhancement unit and the horizontal enhancement unit each comprise:
   a min-max search window having a left part and a right part;
   a center of gravity (COG)-based min-max search unit configured to:
      detect a minimum pixel value MIN_Y and a corresponding position MIN_POS, and a maximum pixel value MAX_Y and a corresponding position MAX_POS based at least partly upon a center of gravity of the left part of the min-max search window and a center of gravity of the right part of the min-max search window, and
      generate an edge width information EdgeWidth using the minimum pixel position MIN_POS and the maximum pixel position MAX_POS;
   a local frequency analysis unit configured to generate a local frequency information FreqRate;
   an enhancement strength control unit configured to generate a control parameter Gain based at least partly upon the edge width information EdgeWidth and the local frequency information FreqRate; and
   an edge enhancer configured to generate either the output YEV or the output YEH based at least partly upon the minimum pixel value MIN_Y, the maximum pixel value MAX_Y, and the control parameter Gain.

11. The apparatus in accordance with claim 10, wherein the enhancement strength control unit comprises:
   a frequency control unit configured to generate a control parameter FreqConst based at least partly upon the local frequency information FreqRate;
   a gradient control unit configured to generate a control parameter GradConst based at least partly upon the edge width information EdgeWidth, the local gradient direction GradDir, and the local gradient magnitude GradMag; and
   a multiplier configured to generate the control parameter Gain based at least partly upon the control parameter FreqConst and the control parameter GradConst.

12. The apparatus in accordance with claim 10, wherein the center of gravity of the left part of the min-max search window and the center of gravity of the right part of the min-max search window are determined by the (COG)-based min-max search unit as follows:

$$COGPos_{left} = \frac{\sum_{i=0}^{N/2} i*|y(i) - MeanY|}{\sum_{i=0}^{N/2} |y(i) - MeanY|}, \text{ and}$$

$$COGPos_{right} = \frac{\sum_{i=N/2}^{N-1} i*|y(i) - MeanY|}{\sum_{i=N/2}^{N-1} |y(i) - MeanY|},$$

where N is a size of the min-max search window, y(i) is a pixel value at position i, and MeanY is an average value of the pixels in the min-max search window and is calculated as follows:

$$MeanY = \frac{1}{N}\sum_{i=0}^{N-1} y(i).$$

13. The apparatus in accordance with claim 10, wherein the minimum pixel value MIN_Y and the maximum pixel value MAX_Y are determined by the (COG)-based min-max search unit as follows:

MAX_POS =

$$\begin{cases} MAX(y(i)|_{i=COGPos_{left}:N/2}) & \text{if } (y(N/2+1) < y(N/2-1)) \\ MAX(y(i)|_{i=N/2:COGPos_{right}}) & \text{else} \end{cases},$$

MIN_POS =

$$\begin{cases} MIN(y(i)|_{i=COGPos_{left}:N/2}) & \text{if } (y(N/2+1) > y(N/2-1)) \\ MIN(y(i)|_{i=N/2:COGPos_{right}}) & \text{else} \end{cases},$$

MAX_Y = y(MAX_POS), and

MIN_Y = y(MIN_POS).

14. The apparatus in accordance with claim 10, wherein the local frequency information FreqRate is determined by the local frequency analysis unit as follows:

$$FreqRate = \frac{1}{N}\sum_{i=0}^{N-1} S(i) \oplus S(i+1),$$

S(i) = Sign(y(i) − MeanY), where Sign(.) is a sign function $$Sign(x) = \begin{cases} 1 & \text{if } (x > 0) \\ 0 & \text{if } (x = 0) \\ -1 & \text{if } (x < 0), \end{cases}$$

⊕ is an Exclusive-Or function $$a \oplus b = \begin{cases} 1 & \text{if } (a \neq b) \\ 0 & \text{else} \end{cases}, \text{ and}$$

$$MeanY = \frac{1}{N}\sum_{i=0}^{N-1} y(i).$$

15. A method, comprising:
receiving an input signal Yin at an input unit;
performing a vertical enhancement of an edge of the input signal Yin at a vertical enhancement unit to generate an output YEV;
performing a horizontal enhancement of the edge of the input signal Yin at a horizontal enhancement unit to generate an output YEH;
generating a local gradient direction GradDir and a local gradient magnitude GradMag based at least partly upon the input signal Yin at a local gradient analysis unit;
generating an output Yout at a mixer by mixing the output YEV with the output YEH using the local gradient direction GradDir, wherein a strength of each of the vertical and the horizontal enhancements of the edge of the input signal Yin used in generating the output Yout is adaptive by the local gradient direction GradDir as a multiplier; and
outputting the output Yout at an output unit.

16. A method, comprising:
receiving an input signal Yin at an input unit;
performing a vertical enhancement of an edge of the input signal Yin at a vertical enhancement unit to generate an output YEV;
performing a horizontal enhancement of the edge of the input signal Yin at a horizontal enhancement unit to generate an output YEH;
generating a local gradient direction GradDir and a local gradient magnitude GradMag based at least partly upon the input signal Yin at a local gradient analysis unit;
generating an output Yout at a mixer by mixing the output YEV with the output YEH using the local gradient direction GradDir; and
outputting the output Yout at an output unit,
wherein output Yout is generated at the mixer as follows:

Yout=(GradDir*YEH+(90−GradDir)*YEV)/90.

17. A method, comprising:
receiving an input signal Yin at an input unit;
performing a vertical enhancement of an edge of the input signal Yin at a vertical enhancement unit to generate an output YEV;
performing a horizontal enhancement of the edge of the input signal Yin at a horizontal enhancement unit to generate an output YEH;
generating a local gradient direction GradDir and a local gradient magnitude GradMag based at least partly upon the input signal Yin at a local gradient analysis unit;
generating an output Yout at a mixer by mixing the output YEV with the output YEH using the local gradient direction GradDir; and
outputting the output Yout at an output unit,
wherein performing vertical enhancement and performing horizontal enhancement unit each comprises:
detecting a minimum pixel value MIN_Y and a corresponding position MIN_POS, and a maximum pixel value MAX_Y and a corresponding position MAX_POS based at least partly upon a center of gravity of a left part of a min-max search window and a center of gravity of a right part of the min-max search window;

generating an edge width information EdgeWidth using the minimum pixel position MIN_POS and the maximum pixel position MAX_POS;

generating a local frequency information FreqRate;

generating a control parameter Gain based at least partly upon the edge width information EdgeWidth and the local frequency information FreqRate; and generating either the output YEV or the output YEH based at least partly upon the minimum pixel value MIN_Y, the maximum pixel value MAX_Y, and the control parameter Gain.

18. The method in accordance with claim 17, wherein generating the control parameter Gain further comprises:

generating a control parameter FreqConst based at least partly upon the local frequency information FreqRate;

generating a control parameter GradConst based at least partly upon the edge width information EdgeWidth, the local gradient direction GradDir, and the local gradient magnitude GradMag; and generating the control parameter Gain based at least partly upon the control parameter FreqConst and the control parameter GradConst.

19. The method in accordance with claim 17, wherein the center of gravity of the left part of the min-max search window and the center of gravity of the right part of the min-max search window are determined as follows:

$$COGPos_{left} = \frac{\sum_{i=0}^{N/2} i * |y(i) - MeanY|}{\sum_{i=0}^{N/2} |y(i) - MeanY|}, \text{ and}$$

$$COGPos_{right} = \frac{\sum_{i=N/2}^{N-1} i * |y(i) - MeanY|}{\sum_{i=N/2}^{N-1} |y(i) - MeanY|},$$

where N is a size of the min-max search window, y(i) is a pixel value at position i, and MeanY is an average value of the pixels in the min-max search window and is calculated as follows:

$$MeanY = \frac{1}{N}\sum_{i=0}^{N-1} y(i).$$

20. The method in accordance with claim 17, wherein the minimum pixel value MIN_Y and the maximum pixel value MAX_Y are determined as follows:

$$MAX\_POS = \begin{cases} MAX(y(i)|_{i=COGPos_{left}:N/2}) & \text{if } (y(N/2+1) < y(N/2-1)) \\ MAX(y(i)|_{i=N/2:COGPos_{right}}) & \text{else} \end{cases},$$

$$MIN\_POS = \begin{cases} MIN(y(i)|_{i=COGPos_{left}:N/2}) & \text{if } (y(N/2+1) > y(N/2-1)) \\ MIN(y(i)|_{i=N/2:COGPos_{right}}) & \text{else} \end{cases},$$

MAX_Y = y(MAX_POS), and

MIN_Y = y(MIN_POS).

21. The method in accordance with claim 17, wherein the local frequency information FreqRate is determined as follows:

$$FreqRate = \frac{1}{N}\sum_{i=0}^{N-1} S(i) \oplus S(i+1),$$

$$S(i) = \text{Sign}(y(i) - MeanY),$$

where Sign(.) is a sign function $$\text{Sign}(x) = \begin{cases} 1 & \text{if } (x > 0) \\ 0 & \text{if } (x = 0) \\ -1 & \text{if } (x < 0), \end{cases}$$

$\oplus$ is an Exclusive-Or function $$a \oplus b = \begin{cases} 1 & \text{if } (a \neq b) \\ 0 & \text{else} \end{cases}, \text{ and}$$

$$MeanY = \frac{1}{N}\sum_{i=0}^{N-1} y(i).$$

* * * * *